(12) United States Patent
Moreau et al.

(10) Patent No.: US 7,644,894 B1
(45) Date of Patent: Jan. 12, 2010

(54) CABLE MANAGEMENT AND TIE-OFF APPARATUS

(76) Inventors: Darrell A. Moreau, 24 Glen Bloom Dr., Manchester, NH (US) 03109; Andre W. Moreau, 13382 Rudi Loop, Spring Hill, FL (US) 34609

( * ) Notice: Subject to any disclaimer, the term of this patent is extended or adjusted under 35 U.S.C. 154(b) by 0 days.

(21) Appl. No.: 12/407,421

(22) Filed: Mar. 19, 2009

(51) Int. Cl.
*F16L 3/00* (2006.01)

(52) U.S. Cl. ........................................................ 248/49

(58) Field of Classification Search .................. 248/49, 248/58, 60, 63, 68.1, 74.1
See application file for complete search history.

(56) References Cited

U.S. PATENT DOCUMENTS

| | | | | | |
|---|---|---|---|---|---|
| 541,557 | A | * | 6/1895 | Lwein | 114/199 |
| 1,769,015 | A | * | 7/1930 | Carpenter | 248/58 |
| 1,953,860 | A | * | 4/1934 | Kraatz | 24/132 R |
| 2,035,231 | A | * | 3/1936 | Haberstro, Jr. | 244/1 R |
| 3,289,984 | A | * | 12/1966 | Clemons et al. | 248/60 |
| 3,494,658 | A | * | 2/1970 | Maes, Jr. | 296/100.15 |
| 3,765,061 | A | * | 10/1973 | Nash | 24/134 P |
| 3,780,829 | A | * | 12/1973 | Wallingford | 182/206 |
| 4,004,768 | A | * | 1/1977 | Evans et al. | 248/59 |
| 4,269,284 | A | * | 5/1981 | Swager | 182/8 |
| 4,368,769 | A | * | 1/1983 | Rookasin | 152/218 |
| 4,730,800 | A | * | 3/1988 | Engman | 248/67 |
| 5,385,320 | A | * | 1/1995 | Ismert et al. | 248/62 |
| 5,542,631 | A | * | 8/1996 | Bruno | 248/58 |
| 5,788,327 | A | * | 8/1998 | Gregory | 297/273 |
| 5,890,683 | A | * | 4/1999 | DePietro | 248/58 |
| 7,287,304 | B2 | * | 10/2007 | Zebe, Jr. | 24/134 P |
| D564,866 | S | * | 3/2008 | Ellery | D8/373 |
| 7,540,338 | B2 | * | 6/2009 | Belik | 175/57 |
| 2005/0034283 | A1 | * | 2/2005 | Mastronardi | 24/298 |
| 2007/0040074 | A1 | * | 2/2007 | Humber et al. | 248/58 |
| 2007/0205335 | A1 | * | 9/2007 | Huebner et al. | 248/58 |

* cited by examiner

*Primary Examiner*—J. Allen Shriver, II
*Assistant Examiner*—Erin Smith
(74) *Attorney, Agent, or Firm*—Robert R Deleault, Esq; Mesmer & Deleault, PLLC

(57) ABSTRACT

A rail rig apparatus includes a body having a middle portion, lower end and an upper end, a lower support having a lower support recess with a lower recess opening, the lower support connected to the lower end of the body, a rig fastener member having a first fastener body end connected to one side of the body, a second fastener body end connected to an opposite side of the body, and a fastener member body extending from the first fastener body end around the lower support recess to the second fastener end, an upper support having an upper support recess with an upper recess opening connected to the upper end of the body, and an upper rope guide mechanism connected to the upper support wherein the upper rope guide mechanism has a pair of opposed jaws defining a space therebetween to receive and secure a rope.

15 Claims, 4 Drawing Sheets

CABLE MANAGEMENT AND TIE-OFF APPARATUS

BACKGROUND OF THE INVENTION

1. Field of the Invention

The present invention relates generally to cables and ropes. The present invention relates to devices for managing cables and ropes.

2. Description of the Prior Art

Ropes, cables, cords and the like have been used for many years in a wide variety of applications. When used, there is undoubtedly a need at some point to secure the robes, cables and the like. Typically, ropes are tied into a knot.

Clamping mechanisms can also be used for cables, ropes and the like. When multiple ropes and/or cables are utilized, management of the plurality of ropes and/or cables becomes more difficult.

For example, in the nuclear power industry, long handled poles are typically used to deliver tooling, lighting, cameras, etc., in and around the reactor cavity and spent fuel pools. In this particular application, cables are normally used to operate the tooling from a remote location. Frequently, these long handled poles are moved to different locations for inspections, maintenance operations, etc. When moved, the associated cabling must also be moved. In doing so, the cables and/or ropes require quick, secure, and effective tie offs. Typically, these tie offs are executed by simply wrapping the rope around the horizontal rails of a handrail and then tying a knot.

When this method of tying off is used, there are several disadvantages and problems that can occur. Most workers are not properly trained (if at all) in tying proper and effective knots. When the knots are tied, they can be tied too tight making it difficult to release the rope or cables in an effective and timely manner. On the other hand, if the knots are not tied secure enough, there is the risk of premature release of the cable and/or rope. Additionally, tying the rope or cable often requires the use of two hands, which can be cumbersome at times and inconvenient and counter-productive.

Crane wells, open bays, and scaffolding platforms where there are hand rails in place for safety purposes are other examples where ropes and/or cables can be problematic. Typically, in all of these locations, ropes are used for hoisting and lifting small tooling, equipment, and buckets. The ropes are draped over the hand rail and down into the cavity (or bay) of the equipment. In some cases, lifting these buckets and equipment can potentially span several building floors. During the lifting operation, the potential for the rope to release from the workers hands due to fatigue or accidental release can be a safety hazard for workers and passersby below.

Thus, there is a need for not only cable management systems but quick and effective rope and cable tie offs for securing suspended cables or ropes, especially when draped over hand rails and other barriers.

Therefore, what is needed is an effective rope and/or cable tie off for securing suspended cables and/or ropes when draped over hand rails and other barriers.

SUMMARY OF THE INVENTION

It is an object of the present invention to provide a cable and/or rope management system. It is another object of the present invention to provide a cable and/or rope management system that effectively and securely ties off suspended cables and/or ropes when draped over hand rails and other barriers.

Within this description, the term "rope" means a strong line or cord made of any material and includes a single strand or multiple twisted or braided strands of material either coated or uncoated.

The present invention achieves these and other objectives by providing a rail rig apparatus that includes a body, an upper support formed at one end of the body for attachment to first or upper rail, a lower support formed at the other end of the body for attachment to a second or lower rail, a rig fastener member connectable to the body for holding the rail rig apparatus onto a first and second rail, and an upper rope guide mechanism connected to the upper support for releasably securing a rope. Rig fastener member is preferably adjustably connectable to the body.

In one embodiment, the lower support has a first set of forked extensions that define a lower support recess. The lower support recess is configured to receive a lower rail around which is looped a fastener body of a rig fastener member. The upper support has an upper support recess for receiving an upper rail and for supporting the rail rig thereon.

In another embodiment, the lower support has a second set of forked extensions that also define a lower recess. The second set of forked extensions are spaced from the first set of forked extensions. The fastener body of the adjustable rig fastener member is looped around the lower support and through the space between the first and second set of forked extensions.

Examples of a usable rig fastener member includes stretchable, elastic components such as a bungee cord, or a rubber cord, or a flexible strap with length adjustable clamps, buckles and the like. The upper support has an upper recess for receiving an upper rail and for supporting the rail rig thereon.

The upper rope guide mechanism has a releasable jaw that receives rope or cable and is capable of holding the rope or cable until released by a user. Preferably, a unidirectional, self-adjusting jaw is used. This type of releasable jaw functions to only release in one direction such that the rope/cable can be funneled through the jaw without resistance. It should be understood that any type of adjustable jaw member may be used in the upper guide mechanism. A securing cleat is optionally included on the rail rig apparatus to provide a secondary mechanism for holding a rope/cable. Also, an optional tending bracket may be included when heavy duty cables/ropes are used. The optional tending bracket provides a barrier around which the heavy duty cable/rope is passed when these types of cables/ropes cannot be bent or flexed through a short radius for securing to the securing cleat.

Another optional feature includes an extension bracket adjacent the upper rope guide mechanism. The extension bracket allows use of the rail rig apparatus with more than one rope/cable. The extension bracket provides a support bracket for additional rope/cable, which then would be secured to the securing cleat or around the optional tending bracket.

The rail rig apparatus of the present invention is designed to fit on multiple size rails and for easy and quick installation. The rail rig apparatus is portable and installs in seconds by simply sliding the lower support onto a lower rail and the upper support onto an upper rail. The adjustable rig fastener member that is attached to the body of the rail rig apparatus at one point is pulled around the lower rail and secured to a second point on the body of the rail rig apparatus. The rail rig apparatus is then ready for use.

DETAILED DESCRIPTION OF THE PREFERRED EMBODIMENT

Figure 1:
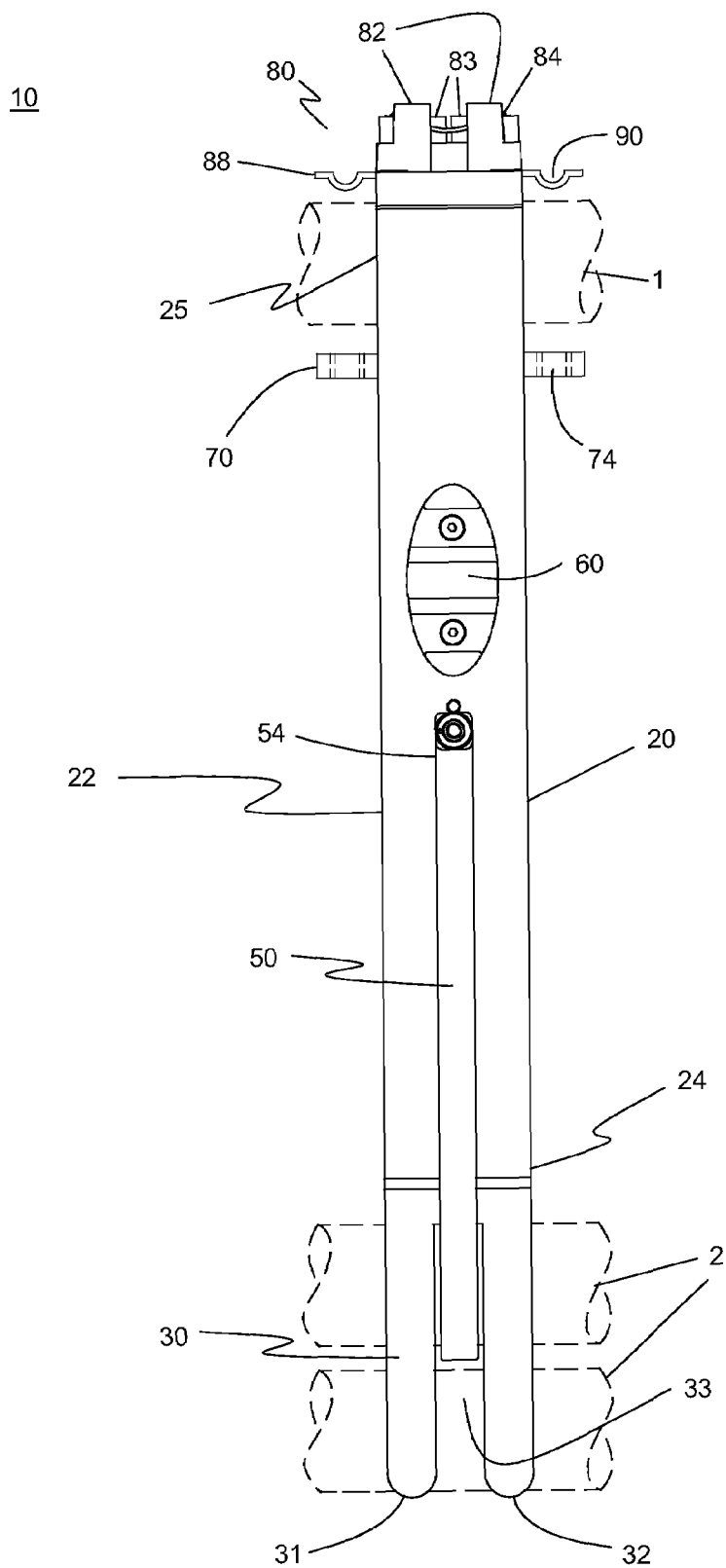
FIG. 1 is a front view of one embodiment of the present invention showing a removable and portable rail rig apparatus.

The preferred embodiment of the present invention is illustrated in FIGS. 1-4. FIG. 1 illustrates a rail rig apparatus 10 of the present invention. Rail rig apparatus 10 includes a body 20, a lower support 30, an upper support 40 (more clearly shown in FIG. 2), an upper guide mechanism 80, a rig fastener member 50, and an optional securing cleat 60. Body 20 may be solid or tubular and includes a middle portion 22, a lower body end 24 and an upper body end 25. Lower support 30 is formed at a lower body end 24 of body 20 and preferably includes a forked shaped structure having a first set of lower support extensions 31 and an optional second set of lower support extensions 32. When optional second set of lower support extensions 32 are included, a space 33 between the first set of lower support extensions 31 and the optional second set of lower support extensions 32 is provided to preferably accommodate rig fastener member 50 therethrough. Rig fastener member 50 is removably connected to body 20 and will be more clearly shown in FIG. 2 and described therewith.

Upper rope guide mechanism 80 includes a pair of opposed jaws 82 spaced from each other to receive and secure a rope. In one embodiment, the pair of opposed jaws 82 are preferably a unidirectional, self-adjusting cam cleat. An optional extension bracket 88 is connected to upper guide mechanism 80 adjacent to the pair of opposed jaws 82. Extension bracket 88 laterally extends away from upper guide mechanism 80 on one or more sides. Securing cleat 60 is attached to body 20, preferably in the area of middle portion 22 of body 20. Upper support 40 (not shown) communicates with an upper rail 1 and will be more clearly shown in FIG. 2 and described therewith. Rail rig apparatus 10 may optionally include a tending bracket 70 connected to body 20 preferably below upper support 40.

In another embodiment, body 20 may be length adjustable to accommodate various rail spacings between upper and lower rails 1, 2, respectively.

Figure 2:
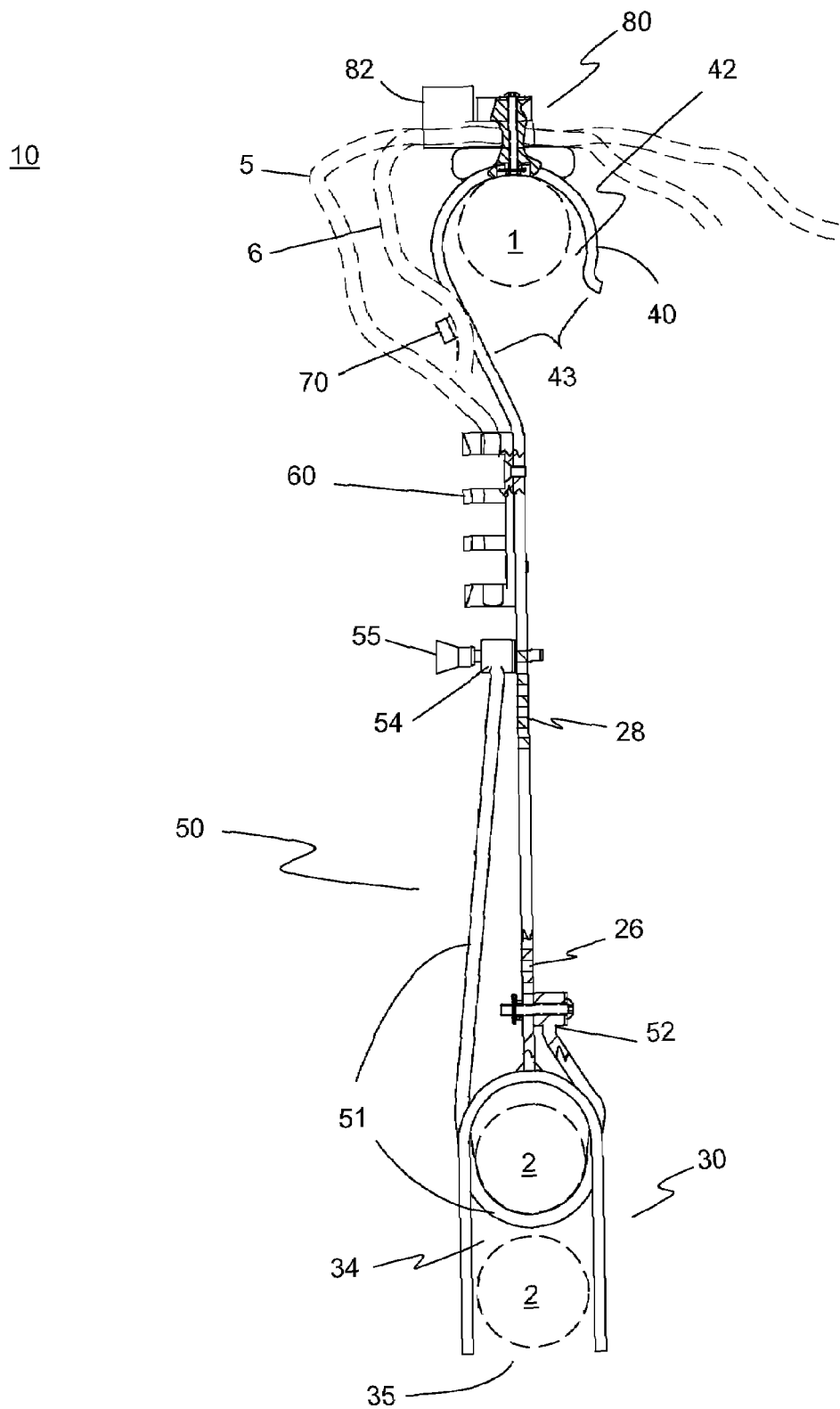
FIG. 2 is a side view of the embodiment shown in FIG. 1.

Turning now to FIG. 2, there is illustrated a side view of rail rig apparatus 10 shown in FIG. 1. Lower support 30 includes a lower support recess 34 that is sized to receive a lower rail 2. In this embodiment, lower support recess 34 has a U-shaped structure with a lower recess opening 35 and has a depth sufficient to receive a major portion of one or more lower rails 2. Rig fastener member 50 includes a fastener member body 51, a first fastener body end 52 and a second fastener body end 54. First and second fastener body ends 52, 54 are preferably removably attached to body 20 on opposite sides of body 20. In one embodiment, body 20 has a plurality of first adjustment apertures 26 adjacent lower support 30 for connectably receiving first fastener body end 52 on one side of body 20 and a plurality of second adjustment apertures 28 for connectably receiving second fastener body end 54 on an opposite side of body 20. First adjustment apertures 26 may optionally be spaced from second adjustment apertures 28 as illustrated in FIG. 2. Because not all upper and lower rails have the same distance separating each other, the plurality of first and second adjustment apertures 26, 28 is one structural embodiment to adjustably adapt rail rig apparatus 10 for use on rails in those varying situations.

To accommodate a variety of spacings between an upper rail 1 and lower rail 2, body 20 of rail rig apparatus 10 may be shortened, lengthened, or made with adjustable and/or telescoping features. Fastener member body 51 is preferably made of a stretchable, elastic material but can also be any cord or strapping material having adjustable fastening mechanisms such as buckles, clamps, and the like.

As illustrated, first fastener end 52 connects to one of the plurality of first adjustment apertures 26 on one side of body 20. Fastener member body 51 extends from its connection point at one of the plurality of first adjustment apertures 26, through space 33 (as illustrated in FIG. 1) between the first and second set of forked extensions 31, 32 and up to second fastener end 54 where it is connected to one of the plurality of second adjustment apertures 28 on the opposite side of body 20. Second fastener end 54 preferably includes a quick release fastener 55 such as a push-pin fastener but could also be any type of fastener commonly used for attaching one component to another. Needless to say, first and second fastener ends 52, 54 may be any type of fastener and may both be quick release fasteners, fixed-positioned fasteners, screws, bolts, and the like or one being removably fixed to body 20 while the other is a quick release fastener.

Upper support 40 forms an upper support recess 42 with an upper recess opening 43 for disposing onto upper rail 1. The preferred configuration for upper support 40 is in the shape of a J-hook. Upper support 40 supports rail rig apparatus 10 on upper rail 1. Upper support 40 connects to upper rope guide mechanism 80 that is used for supporting the cable and/or rope being tied off and/or supported. Upper rope guide mechanism 80 includes opposed jaws 82 and optional extension bracket 88. Opposed jaws 82 are typically spring-loaded to urge jaws 82 toward each other between which rope 5 or cable 6 is passed. Spring-loaded jaws 82 are configured to receive rope 5 or cable 6 through a rope receiving space 86 formed between jaws 82 (shown in FIG. 3) to be pulled through jaws 82 in one direction. One or more biasing members 85 (not shown) mounted on jaws 82 force jaws 82 against rope or cable 5, 6, respectively, when rope 5 or cable 6 is no longer being pulled though jaws 82. The force applied by the one or more biasing members 85 to jaws 82 prevent rope 5 and cable 6 from sliding though jaws 82 in an opposite direction. Accordingly, the spring action of jaws 82 against the rope/cable 5, 6 holds the rope/cable 5, 6 within the jaws 82 and prevents the rope/cable from sliding back through jaws 82. Upper recess opening 43 and lower recess opening 35 may or may not be facing in the same direction.

Securing cleat 60 is connected to body 20 above the plurality of second fastener apertures 24 and near upper support 40. Securing cleat 60 can be any type of cleat known to one of ordinary skill in the art for securing rope such as, for example, a zigzag cleat, a boat cleat, spaced hooks, and the like. Securing cleat 60 provides a secondary location to fasten rope 5 or may serve as a primary securing location when another rope already occupies rope receiving space 86. In addition to opposed jaws 82 and securing cleat 60, extension bracket 88 is optionally provided. Extension bracket 88 is typically engaged when more than one rope/cable 5 is used with rail rig apparatus 10. Extension bracket 88 has a bracket recess 90 (as illustrated in FIG. 1) that supports the additional rope/cable 5 when rope receiving space 86 is occupied. Extension bracket 88 may be used with a second rope, which would then be secured to securing cleat 60, or used for less flexible cable or rope that is not easily amenable to tying to a cleat.

Rail rig apparatus 10 may optionally include a tending bracket 70 preferably positioned below extension bracket 88. Tending bracket 70 is typically used with a cable or rope 6 having a thickness that has less flexibility and is less conducive to tying onto a cleat. When heavy duty cables are used, they may not be able to bend through a small enough radius to insert into or used with securing cleat 60. Tending bracket 70 provides a surface behind which cable/rope 6 passes and performs the function of holding cable/rope 6 since its lack of flexibility for use with securing cleat 60 would also prevent cable/rope 6 from sliding around the end of tending bracket 70 and over extension bracket 88.

For example, as the cable comes through opposed jaws 82 or over extension bracket 88, cable 6 is bent downward and pushed behind tending bracket 70 and placed into an optional groove 74 (shown in FIG. 1) so that cable 6 is not left in a precarious position. Tending bracket 70 is designed to hold cable 6 by the natural stiffness of cable 6 and gravity but can be further optionally secured in place with the simple addition of a safety latch (not shown). The safety latch prevents cable 6 from slipping around an end 71 (shown in FIG. 3) of tending bracket 70. Thus, tending bracket 70 is an alternative mechanism to securing cleat 60.

Figure 3:
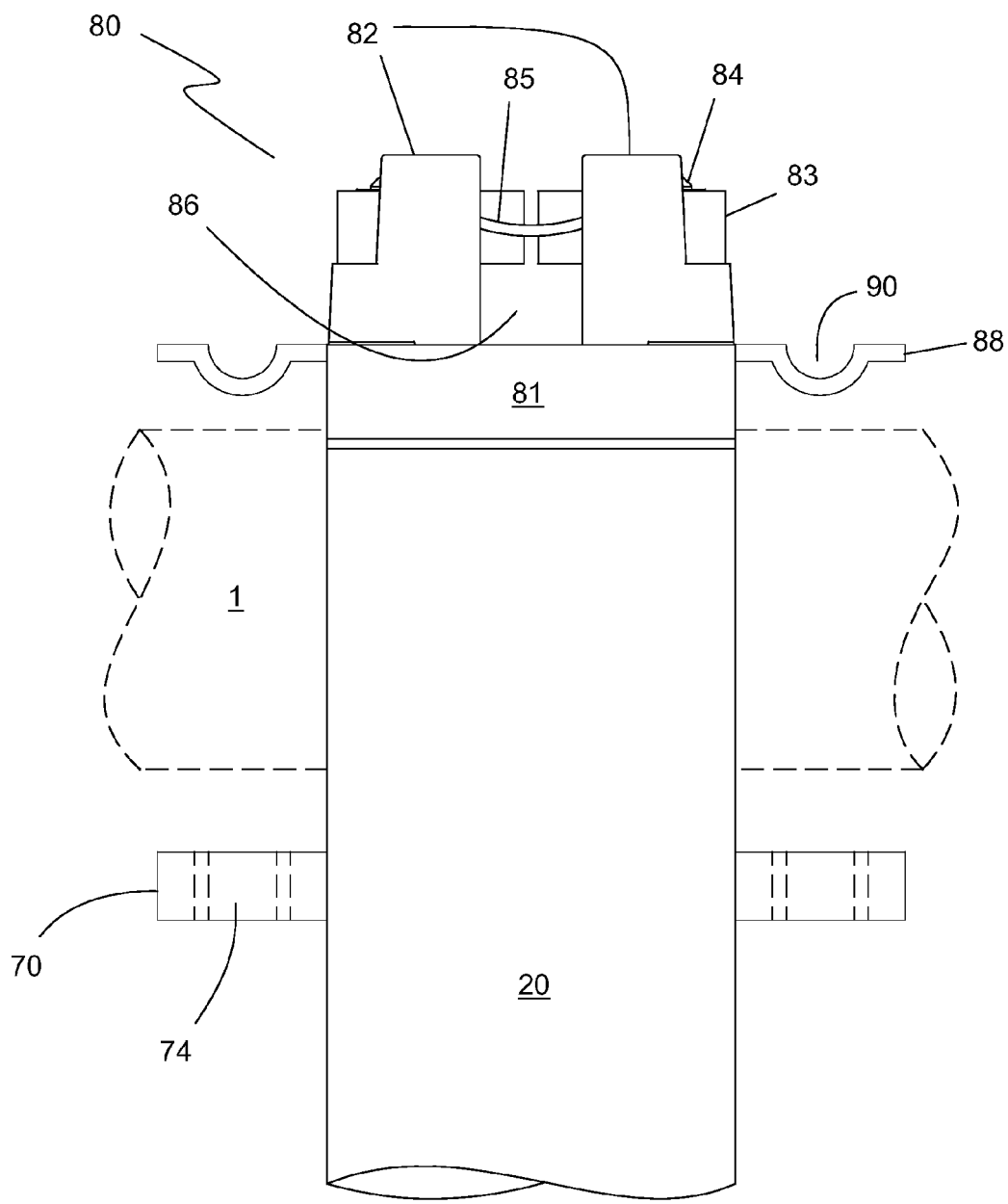
FIG. 3 is an enlarged front view of the present invention showing the upper rope guide mechanism in FIG. 1.

Turning now to FIG. 3, there is illustrated and enlarged view of upper body end 25 shown in FIG. 1. Upper rope guide mechanism 80 includes a jaw support body 81 secured to body end 25, opposed and biased jaws 82 positioned on top of jaw support body 81 and forming rope receiving space 86, an upper jaw retainer 83, and a jaw retainer pin 84 that holds upper jaw retainer 83 and jaw 82 to jaw support body 81. In this embodiment, biasing member 85 is a spring connected to jaws 82 that urges jaws 82 towards each other. It is contemplated that other structural arrangements of one or more biasing members 85 relative to jaws 82 may be used to urge jaws 82 towards each other. It is also contemplated that one of the pair of jaws 82 may be stationary.

Figure 4:
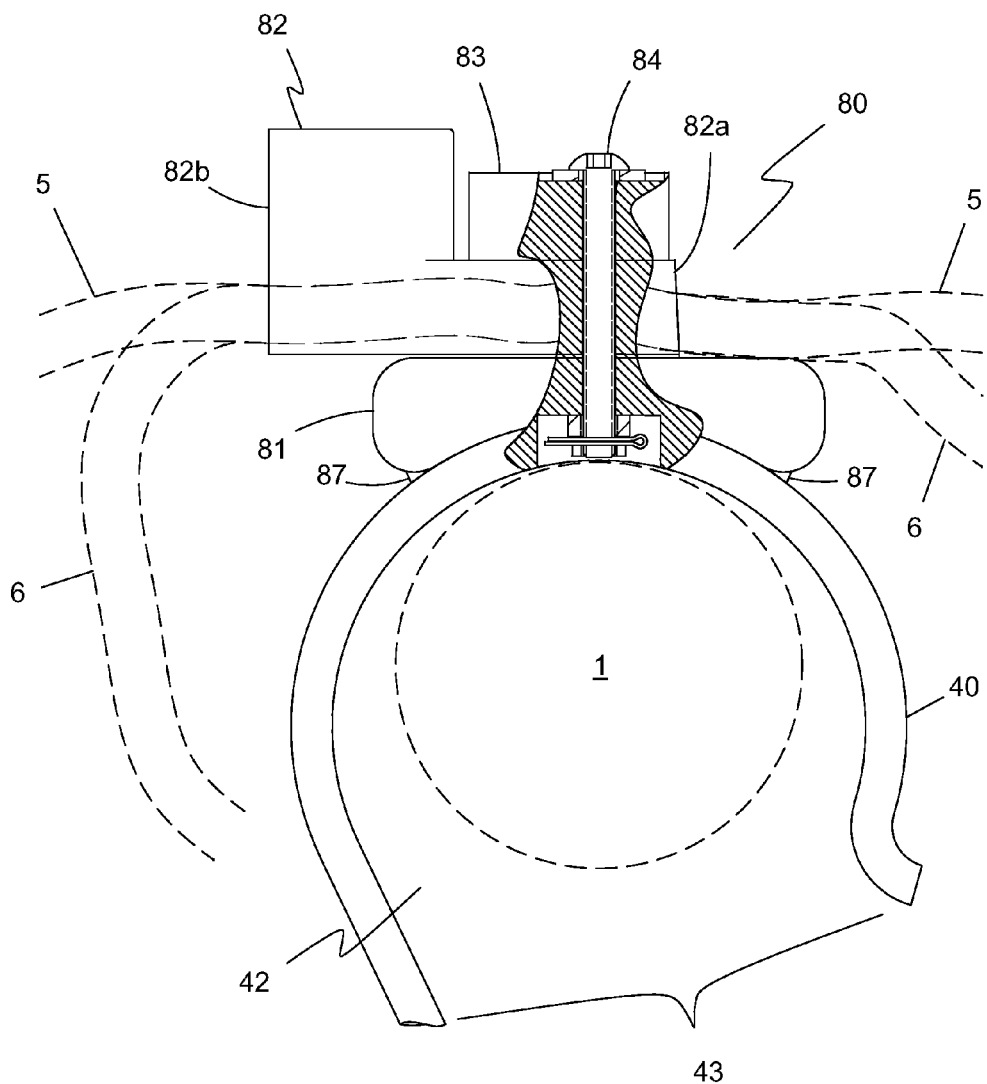
FIG. 4 is an enlarged side view of the present invention showing the upper rope guide mechanism in FIG. 2.

FIG. 4 is an enlarged, side view of upper body end 25 shown in FIG. 2 showing a partial cross-sectional portion of upper rope guide mechanism 80. As illustrated, upper support 40 is mounted onto upper rail 1 with upper rail 1 received within upper support recess 42 through upper recess opening 43. Jaw retainer pin 84 connects jaw 82 and upper jaw retainer 83 to jaw support body 81, preferably using a cotter pin 3 but other devices such as nuts, press-fit caps and the like may be used. In this embodiment, jaw 82 pivots about jaw retainer pin 84 at a jaw pivot end 82a, which causes a jaw grasping end 82b to move through a predefined arc that depends on the distance between jaw grasping end 82b and jaw retainer pin 84. The present invention may have one of the pair of opposed jaws 82 in a fixed, non-pivoting position and the other of the pair of opposed jaws 82 being pivotally connected to jaw support body 81 or both jaws 82 may be pivotally connected to jaw support body 81. Jaw support body 81 may be secured to upper body end 25 and/or upper support 40 using various methods known to those skilled in the art. In the illustrated embodiment in FIG. 4, jaw support body 81 is preferably welded in place.

To use rail rig apparatus 10, a user would place lower support 30 over a lower rail 2 while placing upper support 40 onto an upper rail 1. First fastener end 52 is secured within one of the first adjustment apertures 26 and fastener body 51 is looped around lower rail 2. In the embodiment where a first and second set of forked extensions 31, 32 are included, fastener body 51 is passed through the space between the first and second set of forked extensions 31, 32 and looped around lower rail 2 between first and second set of forked extensions 31, 32. It is contemplated that fastener body 51 may loop around one or more lower rails 2. Second fastener end 54 is secured within a second adjustment aperture 24 such that rig fastener member 50 maintains sufficient clamping/holding pressure around lower rail 2 to maintain upper support 40 onto and against rail 1 to hold rail rig apparatus 10 onto rails 1 and 2. Once rail rig apparatus 10 is secured to rails 1, 2, the user then takes either rope 5 or cable 6 and pulls it through rope receiving space 86 between self-adjusting jaws 82 located on upper support 40. Jaws 82 are preferably a unidirectional cam or cam cleat that will only release in one direction. As the user pulls the excess rope 5, jaws 82 funnel rope 5 through rope receiving space 86 without resistance. When the user has pulled rope 5 to attain the desired result, opposed jaws 82 grip rope 5 and prevent rope 5 from slipping through rope receiving space 86 in the opposite direction. The excess rope 5 is then wrapped around the securing cleat 60 to provide a secondary fastening point insuring rope 5 is safely secured. To release rope 5 from opposed jaws 82, the user simply disengages rope 5 from securing cleat 60 and pulls rope 5 in the same direction as the user initially fed rope 5 into rope receiving space 86 and past opposed jaws 82, which facilitates the release of rope 5 from jaws 82. Once jaws 82 are released from their hold onto rope 5, the user lifts up on rope 5 to free rope 5 from opposed jaws 82.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A rail rig apparatus for securing one or more suspended ropes, the apparatus comprising:
    a body having a middle portion, lower end and an upper end;
    a lower support having a lower support recess with a lower recess opening, the lower support connected to the lower end of the body;
    a rig fastener member having a first fastener body end connected to one side of the body, a second fastener body end connected to an opposite side of the body, and a fastener member body extending from the first fastener body end around the lower support recess to the second fastener end;
    an upper support having an upper support recess with an upper recess opening connected to the upper end of the body; and
    an upper rope guide mechanism connected to the upper support wherein the upper rope guide mechanism has a pair of opposed jaws defining a space therebetween to receive and secure a rope.

2. The rail rig apparatus of claim 1 wherein the lower support has a first set of forked extensions forming the lower support recess.

3. The rail rig apparatus of claim 2 wherein the lower support has a second set of forked extensions parallel to and spaced from the first set of forked extensions.

4. The rail rig apparatus of claim 1 wherein the lower recess opening and the upper recess opening face in the same direction.

5. The rail rig apparatus of claim 3 wherein the rig fastener body extends around the lower support recess through a space between the first set of forked extensions and the second set of forked extensions.

6. The rail rig apparatus of claim 1 wherein the body includes a plurality of first adjustment apertures for connectably receiving the first fastener body end and a plurality of second adjustment apertures for connectably receiving the second fastener body end.

7. The rail rig apparatus of claim 1 further comprising a tending bracket connected to a middle portion of the body.

8. The rail rig apparatus of claim 7 wherein the tending bracket has a tending bracket slot with a width sufficient to prevent the rope from slipping off of the tending bracket.

9. The rail rig apparatus of claim 1 wherein the upper rope guide mechanism further includes an extension bracket laterally extending from a side of the upper rope guide mechanism.

10. The rail rig apparatus of claim 9 wherein the extension bracket has an extension bracket slot with a width sufficient to prevent the rope from slipping off of the extension bracket.

11. The rail rig apparatus of claim 1 wherein the upper rope guide mechanism includes one or more biasing members connected to the pair of jaws to urge each of the pair of jaws towards each other.

12. The rail rig apparatus of claim 1 wherein the pair of jaws is a cam cleat mechanism.

13. The rail rig apparatus of claim 12 wherein the cam cleat mechanism is a unidirectional, self-adjusting cam cleat.

14. The rail rig apparatus of claim 1 further comprising a securing cleat connected to the body.

15. The rail rig apparatus of claim 1 wherein the fastener member body is an elastic member, a flexible strap with adjustable clamps or an elastic member integrally connected to a flexible strap.

* * * * *